United States Patent
Buongiorno et al.

(10) Patent No.: US 6,572,959 B1
(45) Date of Patent: Jun. 3, 2003

(54) RF-SEALABLE PILLOW POUCH

(75) Inventors: Livio Buongiorno, Trezzano sul Naviglio (IT); Vittorio Perego, Busto Arsizio (IT)

(73) Assignee: Cryovac, Inc., Duncan, SC (US)

( * ) Notice: Subject to any disclaimer, the term of this patent is extended or adjusted under 35 U.S.C. 154(b) by 0 days.

(21) Appl. No.: 09/284,679

(22) PCT Filed: Oct. 15, 1997

(86) PCT No.: PCT/EP97/05695

§ 371 (c)(1),
(2), (4) Date: Apr. 15, 1999

(87) PCT Pub. No.: WO98/18620

PCT Pub. Date: May 7, 1998

(30) Foreign Application Priority Data

Oct. 29, 1996 (EP) ............................................. 96117362
May 2, 1997 (EP) ............................................. 97107254

(51) Int. Cl.[7] ........................ B32B 27/00; B32B 27/30
(52) U.S. Cl. ....................... 428/220; 428/349; 428/518; 428/35.7
(58) Field of Search ................................ 428/35.2, 35.4, 428/36.7, 36.1, 220, 337, 339, 518, 520, 349, 516, 522

(56) References Cited

U.S. PATENT DOCUMENTS

| 3,707,590 A | 12/1972 | Wiggins et al. ................ 264/95 |
|---|---|---|
| 3,741,253 A | 6/1973 | Brax et al. .................. 138/137 |
| 4,048,378 A | 9/1977 | Pelzek ......................... 428/483 |
| 4,178,401 A | 12/1979 | Weinberg et al. .............. 428/35 |
| 4,207,363 A | 6/1980 | Lustig et al. ................. 428/35 |
| 4,352,844 A | 10/1982 | Bornstein .................... 428/35 |
| 4,424,243 A | 1/1984 | Nishimoto et al. ........... 428/36 |
| 4,457,960 A | 7/1984 | Newsome ..................... 428/35 |
| 4,605,460 A | * 8/1986 | Schirmer ..................... 156/229 |
| 4,687,711 A | 8/1987 | Vietto et al. ................. 428/515 |
| 4,737,391 A | 4/1988 | Lustig et al. ................. 428/35 |
| 4,792,488 A | * 12/1988 | Schirmer ..................... 428/349 |
| 4,894,107 A | 1/1990 | Tse et al. .................... 156/229 |
| 5,091,241 A | 2/1992 | Lang et al. .................. 428/213 |
| 5,169,696 A | 12/1992 | Lang et al. .................. 428/35.2 |
| 5,399,396 A | 3/1995 | Ohlsson et al. ............... 428/34.7 |
| 5,455,091 A | * 10/1995 | Oreglia et al. ............... 428/36.1 |
| 5,567,488 A | 10/1996 | Allen et al. .................. 428/34.1 |

FOREIGN PATENT DOCUMENTS

| EP | 223531 | 5/1987 |
|---|---|---|
| EP | A-471607 | 2/1992 |
| EP | B-477025 | 3/1992 |
| GB | 2121062 | 12/1983 |
| WO | WO9302859 | 2/1993 |

* cited by examiner

*Primary Examiner*—Harold Pyon
*Assistant Examiner*—Sow-Fun Hon
(74) *Attorney, Agent, or Firm*—Mark B. Quatt

(57) ABSTRACT

A thermoplastic multi-layer film with an even number of layers containing first and second outermost layers each containing ethylene-vinyl acetate copolymer having between 14 and 22 wt. % vinyl acetate, first and second inner layers each containing vinylidene chloride copolymer, and first and second contiguous layers separating first and second inner layers from each other, each layer containing ethylene-vinyl acetate copolymer.

7 Claims, No Drawings

RF-SEALABLE PILLOW POUCH

BACKGROUND OF THE INVENTION

The present invention refers to an RF-sealable pillow pouch of a thermoplastic material particularly suitable for packaging flowable products and to a method of packaging said product in a vertical form-fill-seal machine using an RF sealable, thermoplastic material.

Flowable products, such as powders, liquid and pasty materials, e.g. detergents, liquid soaps, household cleaning products, bleaches, etc., are currently packaged in so called pillow pouches made of PVC. These pillow pouches are typically used as monodose packages or as refill cartridges that are opened and poured in a re-usable rigid or semi-rigid container as desired.

The machine that makes and fills packages in a single operation is called a vertical form-fill-seal (VFFS) machine. Said machine forms pouches from a web of flat flexible film while filling them with the product. The film is fed from a roll to a device that forms it into a tube of a suitable diameter around the product filling tube. The two film edges are then sealed together, longitudinally, either with a lap seal or with a fin seal. As the tube moves down the machine, two horizontal sealing bars come together to form a transverse seal which becomes the bottom of the pouch. At that point, a measured amount of product is allowed to flow through the product filling tube and into the just formed pouch. By the time filling is complete, the top of the pouch has traveled down to the sealing bar location, where the bars once again meet to simultaneously create the top seal and the bottom seal of the next pouch above. Alternatively, it is also possible to manufacture the pillow pouches in two separate steps, where the first step is the production of the pouches by any conventional system and the second one is the pouch filling In a vertical machine followed by the sealing of the pouch mouth.

Pillow pouches are characterized in that at least one of the transverse sealing is a melt cut sealing. The melt cut sealing Is a sealing carried out with heating while at the same time the film is pressed and cut. The sealing bars are therefore equipped with a knie which cuts through the seal to separate the filled pouch from the machine. To give the appearance of a pillow, as the name does suggest, once the pouch is filled with the metered volume of flowable product, generally of the liquid or pasty product, air or a suitable gas is injected before the transverse sealing bars are pressed together.

Working with PVC at least the transverse sealing system in these VFFS machines is based on dielectric heating or RF heating. In this system high frequency electric current is passed through the film by the sealing bars. When the film contains polar molecules, as in the case of PVC, these molecules oscillate under the influence of the current and this molecular agitation is converted to heat sufficient to melt the film in the seal area.

The advantages of "pillow pouches" are obvious: reduced volume, reduced consumption and waste of plastic material, lower cost, etc.

However the use of PVC, that up to now has been considered the polymer of choice for this application, presents many drawbacks.

First of all PVC has no gas-barrier and moisture-barrier characteristics. Volatile components, e.g. perfumes, aromas, etc., can easily escape through the packaging material, thus reducing the content thereof in the packaged product and, when these components have an unpleasant smell, e. g. in case of bleaches, imparting said smell to the whole package. Water also can evaporate through the PVC layer thus reducing the volume of the packaged product and increasing the concentration of the non volatile components therein.

Secondly, PVC generally contains a high level of plasticizers. Said plasticizers do easily migrate Into the packaged product with a consequent package integrity problem. The mechanical properties of PVC films in fact are determined by the level of plasticizers: a decrease In the amount of plasticizers due to their migration into the packaged product will increase the stiffness and brittleness of PVC thus reducing its mechanical (puncture, abuse) resistance.

A third disadvantage of the use of thick PVC films is the amount of chlorine containing polymer that needs to be disposed of.

PVC replacement in the manufacture of pillow pouches for the packaging of flowable products has been widely described in the patent literature.

Of interest is EP-B-477,025 that describes the use of a multilayer film having a barrier layer of a thermoplastic material, preferably an LLDPE or a composite of a polyethylene layer and a polyamide or EVOH layer, and on at least one side thereof a layer of an RF-sealable polymer, e.g. EVA with a high VA content According to EP-B-77,025, the problem created by the low RF-sensitivity of the thermoplastic barrier materials is overcome by the use of sealing layers of EVA with a high VA content and a low, controlled, content of additives, while the problem of sticking that derives from the use of such a sealing layer is overcome by the use of structures with a matted surface. These structures do not contain chlorine and have moisture barrier properties, however they do not overcome the other drawbacks connected with the use of PVC as for instance the structures described In EP-B-477,025 do not have odour-barrier properties or only to a limited extent While in fact polyethylene and polyamide have no or moderate odor barrier properties, EVOH is very sensitive to moisture and its odor barrier properties, that are satisfactory under dry conditions, are drastically reduced after exposure to a moistured environment. Furthermore, owing to the low RF-sensitivity of these barrier materials, and depending on their thickness, the seal strength of the RF-seal may sometimes be unsatisfactory in spite of the high VA content of the EVA sealing layer. Finally, with these structures an additional step in the film manufacturing process is required to provide the matted surface, what adds an extra-cost to the film.

Also of Interest is EP-A-471,607 that describes RF-sealable thermoplastic films particularly suitable for packaging gas-emitting flowable products. Said films comprise a core polyolefin layer and EVA sealing layers and are characterized by an oxygen transmission rate (OTR) of at least about 600 $cm^3/m^2.d.atm$. This high OTR is required, according to EP-A-471,607, because in packaging gas-emitting products, such as bleaches, a gas, typically oxygen, is evolved during storage and should be allowed to be dissipated through the pouch wall to avoid that pressure builds up into the pouch and the pouch seal breaks.

Also the structure described in EP-A-471,607 does not contain chlorine and has moisture barrier properties but it has no odor barrier properties. Furthermore, also in this case, the presence of a thick core layer of polyolefin material with a low RF sensitivity affects the RF sealability of the overall structure. It is probably due to the low seal strength of the thus obtained RF-seal that such a high OTR is needed to avoid breaking of the seal.

It has now been found that It Is possible to solve the above problems in a satisfactory way by using, as PVC replacement in the manufacture of said pillow pouches, a film comprising an RF-sealable outer layer of ethylene-vinyl acetate copolymer with from about 14 to about 28 wt. % of VA and a layer of PVDC.

The use of such a film as a PVC replacement offers many advantages as the RF-seal will have a good seal strength because the presence of a PVDC layer improves the sealability of the overall structure; it has also been found that the presence of a PVDC layer imparts to the pouch the desired balance of stiffness and flexibility so that films 75–150 μm thick can be run in the commercial VFFS machines giving a better performance than conventional 200–250 μm thick PVC films, and thus drastically reducing the amount of plastic material per package which needs to be disposed of after use; the amount of chlorine containing polymer is highly reduced as the PVDC layer will be only few micron thick while PVC pouches generally require a 200–250 μm-thick sheet Furthermore, by suitably selecting the thickness and/or composition of the PVDC layer it is possible to "modulate" the gas- and odor-barrier properties of the end structure to the desired extent.

SUMMARY OF THE INVENTION

In accordance with the present invention, there is provided a coextruded thermoplastic multilayer barrier film with an even number of layers, comprising first and second outermost layers each comprising ethylene-vinyl acetate copolymer, first and second inner layers each comprising vinylidene chloride, and first and second contiguous layers separating first and second inner layers from each other, each layer comprising ethylene-vinyl acetate copolymer. Preferably, the outermost layers of ethylene-vinyl acetate have a vinyl acetate content between 14 and 22 wt. %, and the contiguous layers of ethylene-vinyl acetate have a vinyl acetate content from 22 to 28 wt. %. The barrier film is a layflat tubular film having its interior layflat surfaces laminated together by self-welding.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers.

As used herein, the term "polymer" refers to both homopolymers and co-polymers as defined above.

As used herein the term "ethylene homopolymers" identifies polymers consisting essentially of an ethylene repeating unit As used herein, the phrase "ethylene α-olefin copolymer", and "ethyieneolα-olefin copolymer", refer to such heterogeneous materials as linear low density polyethylene (LLDPE), linear medium density polyethylene (LMDPE) and very low and ultra low density polyethylene (VLDPE and ULDPE); and homogeneous polymers such as metallocene catalyzed polymers such as EXACT™ materials supplied by Exxon, AFFINITY™ and ENGAGE™ materials supplied by Dow, LUFLEXEN™ materials supplied by BASF and TAFMER™ materials supplied by Mitsui Petrochemical Corporation. These materials generally Include copolymers of ethylene with one or more comonomers selected from C4 to C10 α-olefins such as butene-1 (i.e., 1-butene), hexene-1, octene-1, etc.

As used herein the term "ethylene-ethylenically unsaturated ester copolymer" refers to the copolymers of ethylene with one or more ester comonomers containing a vinyl group such as ethylenelvinyl acetate copolymers, ethylenelethyl acrylate copolymers, ethylenelbutyl acrylate copolymers, ethylenelmethyl acrylate, ethylenelme thyl methacrylate copolymers.

As used herein, the phrase "modifled polymer", as well as more specific phrases such as "modified ethylene vinyl acetate copolymer", refer to such polymers having an acid or, preferably, an anhydride functionality, such as maleic or fumaric anhydride or acid, grafted thereon and/or copolymerized therewith and/or blended therewith. Preferably, such modified polymers have the anhydride functionality grafted on or polymerized therewith, as opposed to merely blended therewith.

As used herein, "PVDC" refers to a vinylidene chloride copolymer wherein a major amount of the copolymer comprises vinylidene chloride and a minor amount of the copolymer comprises one or more unsaturated monomers copolymerizable therewith, typically vinyl chloride, and alkyl acrylates (e.g. methyl acrylate) or to a blend thereof in different proportions. This term also includes the co-polymer (s) when blended with additives, such as stabilizers, plasticisers, etc., as known in the art.

As used herein, the phrase "directly adhered", as applied to film layers, is defined as adhesion of the subject film layer to the object film layer, without a tie layer, adhesive, or other layer therebetween. As used herein "contiguous", when referred to two layers, is intended to refer to two layers that are directly adhered one to the other. In contrast, as used herein, the word "between", as applied to a film layer expressed as being between two other specified layers, includes both direct adherence of the subject layer to the two other layers it is between, as well as lack of direct adherence to either or both of the two other layers the subject layer is between, i.e., one or more additional layers can be imposed between the subject layer and one or more of the layers the subject layer is between.

As used herein, the phrases "inner layer" and "internal layer" refer to any film layer having both of its principal surfaces directly adhered to another layer of the film.

As used herein, the phrase "outer layer" refers to any film layer having only one of its principal surfaces directly adhered to another layer of the film.

As used herein, the term "core", and the phrase "core layer" refer to any internal film layer which has a primary function other than serving as an adhesive or compatibilizer for adhering two layers to one another.

As used herein, the phrase "bulk layer" refers to any layer which is present for the purpose of improving the abuse-resistance, toughness, modulus, etc., of the film. Bulk layers generally comprise polymers which are inexpensive relative to other polymers in the film which provide some specific purpose unrelated to abuse-resistance, modulus, etc.

As used herein, the phrase "tie layer" refers to any internal layer having the primary purpose of adhering two layers to one another.

DETAILED DESCRIPTION OF THE INVENTION

A first object of the present invention is a pillow pouch containing a flowable product characterized in that the packaging material is a thermoplastic film comprising an RF sealable outer layer of EVA containing from about 14 to about 28 wt. % VA and a layer of PVDC.

As used herein the term "a layer of EVA" is used to mean that the base thermoplastic material of the layer is essentially EVA. In the EVA layer the thermoplastic material may however contain the conventional anti-block and slip agents, such as silica, either natural or synthetic silica, calcium stearate, amides or bis-amides, etc., opacifying agents, e.g. $CaCO_3$, pigments, e.g. $TiO_2$, UV absorbers, etc. as known in the art. These additives can be added up to about 30 wt. %, preferably however they are limited to a maximum of about 20%, and more preferably to a maximum of 15 wt. %, calculated on the weight of the RF-sealable outer layer. Generally anti-block and slip agents are added to the sealing layer in an amount up to about 10 wt. %, typically up to 8 wt. %, while a higher amount of opacifying agents and pigments, up to about 20 wt. %, can be employed without problems. As used herein "essentially EVA" does not exclude the presence of minor proportions, e.g. up to less than about 10%, of other thermoplastic materials provided said materials do not impair the RF-sealability of said outer layer. Examples of thermoplastic materials that might be present In minor proportions in the outer RF-sealable layer of EVA are ethylenemethylacrylate, ethylene-ethylacrylate, ethylene-butylacrylate copolymers, PVDC, and the like polar polymers. In a preferred embodiment however the base thermoplastic material of the EVA layer is only EVA.

Preferably, the thermoplastic film to be used in the manufacture of pillow pouches according to the present invention, has a sealing layer of an ethylene-vinyl acetate copolymer containing at least 16 wt. % of vinyl acetate. More preferably said ethylene-vinyl acetate copolymer will contain from about 16 to about 22 wt % VA. While ethylene-vinyl acetate copolymers with a VA content lower than 14 wt. % are hardly RF-sealable, ethylene-vinyl acetate copolymers with more than 22 wt. % VA are RF sealable but they are generally very soft and sticky and may create some difficulties when used as the outer layers in a structure to be run on a conventional VFFS machine.

When used in applications where high odor- and gas-barrier properties are required, the film will typically have an Oxygen Transmission Rate (OTR) lower than 50 $cm^3/m^2.d.atm$, when measured at 23° C. and 0% or 100% of relative humidity, and a moisture vapour transmission rate (or MVTR) $\leq 25$ $g/m^2.d$ when measured at 38° C. and 98% of relative humidity.

While the OTR is evaluated by following the method described in ASTM D-3985 and using an OX-TRAN instrument by Mocon, the MVTR is measured by ASTM F-1249 using a Permatran W-1 instrument by Mocon.

This can be easily obtained using a PVDC with a low content of plasticisers. In such a case, the thickness of PVDC can be as low as 3 $\mu$m still providing for optimum gas- and odour-barrier properties, but preferably it is at least 5 $\mu$m, and typically it is comprised between about 5 and about 25 $\mu$m. These PVDC with a low content of plasticisers are those conventionally employed in the food packaging area to obtain high oxygen barrier properties.

On the other hand when used for packaging gas-emitting products the film will typically have an OTR of at least about 100 $cm^3/m^2.d.atm$, preferably of at least 120 $cm^3/m^2.d.atm$, and even more preferably of at least 150 $cm^3/m^2.d.atm$.

Such a high OTR can be obtained in a PVDC containing structure by reducing the thickness of PVDC andlor increasing the amount of plasticisers blended therein. It is in fact widely known that the oxygen permeability of PVDC increases with increasing plasticiser content Additives that can satisfactorily be employed to increase the OTR of the PVDC layer comprise the plasticizers conventionally employed, in small amounts, as processing aids for high-barrier PVDC, such as epoxy compounds, e.g. epoxidized linseed oil, epoxidized soybean oil, epoxy resins (such as for instance EPON 828 by Shell), alkyl esters, such as dibutyl sebacate, acetal tributyl citrate, phosphates, such as 2-ethyl hexyl diphenyl phosphate (sold by Monsanto as Santicizer-141), phenoxypropylene oxide, EVA with a wt, % VA higher than 15 (such as the Elvax™ resins by DuPont), modified EVA (such as the Elvaloy™ resins sold by DuPont), impact modifiers such as chlorinated polyethylene, butyl rubber, chloro-butyl rubber, ethylene-propylene rubber (EPM), elastomeric terpolymer from ethylene, propylene and a conjugated diene (EPDM), polyisobutylene, styrene-butadiene copolymers, etc.

The amount of plasticizer(s) to be added to the PVDC resin depends on the desired OTR and on the PVDC thickness in the overall structure. Generally, however, it becomes difficult to blend the PVDC resin with the liquid plasticizer(s), such as the epoxidised linseed oil, the epoxidised soybean oil, the epoxy resins and the alkyl esters, when the amount thereof is higher than 16–20 wt. %. Typically therefore the amount of liquid plasticizer(s) in the PVDC blend will be up to about 15 wt. %, preferably from about 1 wt. % up to about 10 wt. %, more preferably from about 3 wt. % up to about 8 wt. %. Solid plasticizers, such as EVA, modified EVA, impact modifiers, e.g. those listed above, can be admixed to the PVDC up to about 50 wt. %, preferably up to about 40 wt. % and more preferably up to about 30 wt. %. Solid and liquid plasticizers can also be employed in combination. In such a case the PVDC powder is first thoroughly blended with the solid plasticizer(s), in powder form, and then the liquid plasticizer(s) is blended thereto.

Other additives, such as stabilizers, UV absorbers, deodorizers, antioxidizers, etc. can be added to the PVDC resin. These other additives are generally used in minor amounts, typically up to about 2 wt %.

To increase the film OTR the thickness of the PVDC can be reduced down to about 1 $\mu$m. Conventional thickness, e.g. 3, 5, 10 $\mu$m, or even more, may however provide the desired OTR depending on the amount and type of plasticisers contained therein.

Preferably the film according to the invention has at least 3 layers, wherein the PVDC layer is a core layer and the other outer layer, that may be involved in the longitudinal sealing in case of lap seals, is also of ethylene-vinyl acetate copolymer with from about 14 to about 28 wt. % of VA.

Other layers may be present in the film such as tie layers or bulk layers. Suitable bulk layers will comprise ethylene-ethylenically unsaturated ester copolymers, preferably ethylene-vinyl acetate copolymer, polyethylene homopolymers or ethylene-α-olefin copolymers, provided the RF sealability of the structure is maintained.

Suitable tie layers may comprise modified ethylene-vinyl acetate copolymers or modified polyethylenes.

In a preferred embodiment the thermoplastic film to be used in the manufacture of pillow pouches according to the present invention will comprise at least 5 layers with at least one core layer of PVDC, outer layers of ethylene-vinyl acetate copolymers with from about 14 wt. % VA, preferably about 16 wt. % VA, to about 28 wt. % VA and Intermediate tie layers comprising optionally modified ethylene-vinyl acetate copolymers.

As indicated above, thermoplastic films 75–150 $\mu$m thick could replace PVC in the current VFFS machines and provide a better performance than the conventional 250 $\mu$m thick PVC film used in these machines. Thicker films can however be employed for highly demanding applications or thinner films for very small pouches. Generally, the thickness of suitable films may range from about 50 to about 250 µm, preferably it will range from about 70 to about 200 µm, more preferably from about 75 to about 150 µm.

The thickness of the sealing layer is generally at least 10 µm, preferably it is at least 20 µm, and even more preferably at least 30 µm. As the polymer used for the sealing layer may also be used to provide the desired thickness to the film, in some instances very thick sealing layers will be present, such as in the case of a 3-layer structure.

The thermoplastic film suitable for use in the manufacture of pillow pouches according to the present invention is generally obtained by coextrusion. The film is not stretched or oriented, at least intentionally. A slight orientation, so-called accidental orientation, may be present depending on the production method employed.

A preferred method of manufacture thereof is the hot blown method.

Alternatively it is possible also to use the cast extrusion method, either through a round or preferably through a flat die. The cast extrusion method also allows to obtain the film by extrusion coating.

In a most preferred embodiment the film will be obtained by the bubble collapse technique that provides for collapsing the bubble obtained by the hot blown method, when the resin inside is still hot, and pressing it so as to obtain a single web with a thickness twice that of the extruded film and an even number of layers with two separate PVDC layers. Said preferred film may for instance comprise 6, 8, or 10 layers, preferably 6 or 10. To improve adhesion between the two innermost layers of the coextruded film of the bubble, preferably an ethylene-vinyl acetate copolymer with a high content of VA is employed, such as an ethylene-vinyl acetate copolymer with from about 16 to about 35 wt. % VA, preferably from about 18 to about 32 wt. % VA, more preferably from about 22 to about 28 wt % VA.

The films obtained by this method are particularly suitable as PVC replacement in the manufacture of pillow pouches. The presence of two separate PVDC layers further improves the desired balance between stiffness and flexibility, while the manufacturing cost is reduced because the ply separation step is avoided.

A second object of the present invention is therefore a symmetrical thermoplastic film with an even number of layers, outer layers comprising an ethylene-vinyl acetate copolymer with from about 14 to about 28 wt. % of VA and two PVDC inner layers, separated by at least two contiguous layers comprising ethylene-vinyl acetate copolymer.

Preferably said symmetrical structure will have a thickness of at least about 50 µm, more preferably at least about 70 µm, and even more preferably at least about 75 µm.

In a preferred embodiment at least two contiguous layers inbetween the two PVDC layers in said symmetrical structure comprise ethylene-vinyl acetate copolymer with from about 16 to about 35 wt. % VA, preferably from about 18 to about 32 wt. % VA, more preferably from about 22 to about 28 wt. % VA.

Preferred symmetrical structures will comprise outer layers of ethylene-vinyl acetate copolymer with from about 14 to about 28 wt. % of VA and two PVDC inner layers, separated by at least two contiguous layers of ethylene-vinyl acetate copolymer with from about 22 to about 28 wt. % VA.

A third object of the present invention is a symmetrical thermoplastic film with an even number of layers, outer layers comprising an ethylene-vinyl acetate copolymer with from about 14 to about 28 wt. % of VA and two PVDC inner layers, separated by at least two contiguous layers comprising ethylene-vinyl acetate copolymer, whenever obtained by the collapsed bubble process.

In the manufacture of pillow pouches with the thermoplastic material according to the present invention, any VFFS machine can be used which is equipped with an RF sealing equipment, such as for instance those commercially available from Thimmonier, or Sertic. In line of principle however any conventional VFFS machine can be adapted to the manufacture of RF-sealable pillow pouches by simply equipping it with a welding apparatus such as those commercially available from e.g. Colpitt, Cosmos, or Kiefel.

While the longitudinal seal can be obtained either by a conventional heat seal or by an RF seal, the transverse seal is always obtained by an RF seal. In the actual practice the RF seal is obtained by applying a pressure to the two film webs to be welded together, e.g. by means of a couple of bars, and welding the two webs together by RF at a frequency of about 27 MHz, which is the usual frequency provided in RF welding apparatuses. The temperature of the bars can be varied from about room temperature to as high as possible as long as the film does not stick thereto. In line of principle it would be preferable to have heated bars as this would shorten the welding time. While with PVC the bars are kept at about room temperature because PVC starts sticking at temperatures just above room temperature, with the thermoplastic films according to the present invention, having EVA outer layers, the temperature of said bars can suitably be increased up to 70–80° C. The welding time is—as indicated above—function of the temperature of the bars, but also of the pressure applied, of the thickness of the film, etc. Typically welding time of from about 0.5 to about 3 seconds can be used and pressure up to about 6 atm, preferably up to 5 atm. Optimal welding conditions can however be easily set by any skilled operator.

The film according to the present invention can however be employed in the manufacture of pillow pouches in any type of machine that can be used to this purpose.

A fourth object of the present invention is a method of packaging a flowable product in a pillow pouch using an RF weldable film characterized in that the RF weldable film is a multilayer thermoplastic film with an RF sealable outer layer of EVA containing from about 14 to about 28 wt. % VA and a PVDC layer. In a preferred embodiment of this method of packaging, the flowable product is packaged in a pillow pouch by means of a VFFS machine.

The invention will now be described with reference to the following examples which are intended to be illustrative of some preferred embodiments of thermoplastic films particularly suitable for the manufacture of pillow pouches for packaging of flowable products.

Said examples should not be interpreted as a limitation to the scope of the present Invention.

Melt Flow Indexes (MFI's) are measured by ASTM D-1238, Condition E, 190° C./2.16 kg, and are reported in grams/10 minutes.

The densities have been measured by ASTM D 792.

Melting points, if not otherwise indicated, have been determined by DSC following ASTM D-3418 ($2^{nd}$ heating −10° C./min).

OTR is evaluated, at 23° C. and 0% or 100% R.H., according to ASTM D-3985 using an OX-TRAN instrument by Mocon.

MVTR is measured by ASTM F-1249 using a Permatran W-1 Instrument =by Mocon.

EXAMPLE 1

A 3-layer film is obtained by hot blown having the following structure: A/B/A, wherein A is an ethylene-vinyl acetate copolymer with 18 wt % VA, MFI=0.7 g/10', m.p.= 87° C. (Elvax 3165 commercially available from DuPont) comprising about 0.3% of silica and about 0.5% of erucamide, and is about 42 μm thick; B is a 3 μm-thick layer of PVDC (VDCGC) containing about 7 wt. % of epoxidized soybean oil, about 1 wt. % of hydrotalcite and about 0.3 wt. % of a UV absorber.

EXAMPLE 2

A 5-layer film is obtained by hot blown having the following structure: A/C/B/C/A, wherein the resins employed for layers A and B and the additives contained therein are as defined in Example 1 and C is an ethylene-vinyl acetate copolymer with about 27 wt. % VA, MFI=4 g/10', m. p.=72° C. (Evatane™ 2803 commercially available from Elf Atochem). The overall thickness of the structure was 75 μm, with a layer ratio of 5/2/1/2/5.

EXAMPLE 3

A 5-layer film is obtained by hot blown having the following structure: A/C/B/C/A, wherein the resins employed for layers A and B and C and the additives contained therein are as defined in Example 2. The overall thickness of the structure was 140 μm, with a layer ratio of 5/1/2/1/5.

EXAMPLE 4

A white and glossy 5-layer film having the following structure: A'/C/B/C/A wherein A, B, and C are as defined in Example 2 and A' corresponds to A with the addition of 6 wt. % of a masterbatch of white pigment (60 wt. % $TiO_2$, 40 wt. % of carrier ethylene-vinyl acetate copolymer), is obtained by hot blown.

EXAMPLE 5

A 10-layer film is obtained by coextruding a 5-layer film having the structure A/C/B/C/C, wherein A, B, and C are as defined in Example 1 and 2, by the hot blown method and then collapsing the tube during winding at the winding machine by means of collapsing pinch rolls. The final film has the following structure: A/C/B/C/C/C/B/C/A, an overall thickness of 130 μm, and a layer ratio of 10/5/1/5/10/10/ 5/1/5/10.

OTR of this structure is 115 $cm^3/m^2$.d.atm.

EXAMPLE 6

A 10-layer film having the structure A'/C/B/C/C/C/B/ C/A' is obtained by following the procedure of Example 5 but replacing resin A with A' as defined in Example 4.

EXAMPLE 7

The procedure of Example 5 is repeated by replacing B with B' which is PVDC (VDC-VC) comprising 10 wt. % of epoxidized soybean oil, 1 wt. % of hydrotalcite, and 0.3 wt. % of a UV absorber. The end 10-layer film, 130 μm thick, has the following structure A/C/B'/C/C/C/B'/C/A wherein the thickness ratio among the layers is as in Example 5.

OTR of this structure is 141 $cm^3/m^2$.d.atm.

EXAMPLE 8

The procedure of Example 5 is repeated by replacing B with B" which is PVDC (VDC-VC) comprising 4 wt. % of epoxidized soybean oil, 1 wt. % of hydrotalcite, 0.3 wt. % of a UV absorber and about 5 wt. % of a modified EVA (Etvaloy™ 742, commercially available from DuPont) The end 10-layer film, 130 μm thick, has the following structure A/C/B"/C/C/C/B"/C/A wherein the thickness ratio among the layers is as in Example 5.

OTR of this structure is 199 $cm^3/m^2$.d.atm.

EXAMPLE 9

The procedure of Example 5 is repeated by replacing B with B''' which is PVDC (VDC-VC) comprising 4 wt. % of epoxidized soybean oil, 1 wt. % of hydrotalcite, 0.3 wt. % of a UV absorber and about 10 wt. % of a modified EVA (Elvaloy™ 742, commercially available from DuPont) The end 10-layer film, 130 μm thick, has the following structure A/C/B'''/C/C/C/B'''/C/A wherein the thickness ratio among the layers is as in Example 5.

OTR of this structure is 394 $cm^3/m^2$.d.atm.

EXAMPLE 10

A 5 layer film having the structure A/C'/B/C'/A has been obtained by following the procedure of Example 2 but using C', an anhydride-grafted polyolefin in ethylene-vinyl acetate copolymer (Plexar™ 107 commercially available from Quantum), instead of resin C.

EXAMPLE 11

A 10-layer film having the structure A"/C/B/C/C/C/B/ C/A" is obtained by following the procedure of Example 5 but replacing A with A" which is a blend of A and 20 wt. % of a masterbatch comprising 40 wt. % of A as the carrier and the remaining 60 wt. % of a mix of $TiO_2$, $CaCO_3$, silica and erucamide. The thickness of the two combined PVDC layers is 8 μm, that of each of the two outer layers 40 μm, and the thickness of the overall 10-layer film is 130 μm.

EXAMPLE 12

The procedure of Example 9 is repeated by increasing the amount of modified EVA from 10 wt. % to 25 wt. %.

OTR of this structure is about 1,000 $cm^3/m^2$.d.atm.

EXAMPLE 13

A 7-layer film having the structure A/D/C'/B/C'/D/A wherein A, B, and C' are as defined in Examples 1 and 10, and D is an ethylene-octene-1 copolymer with d=0.920, MFI 1 g/10', and m.p. =124° C. (Dowlex™ 2045E commercially available from Dow), is obtained by the hot-blown technique. The overall thickness is 120 μm and the layer ratio is 9/2/2/2/2/2/9.

EXAMPLE 14

A 10-layer film having the structure A"/C/$B^{iv}$/C/C/C/ $B^{iv}$/C/A" is obtained by following the procedure of Example 5 but replacing A with A" which is a blend of A and 20 wt. % of a masterbatch comprising 40 wt. % of A as the carrier and the remaining 60 wt. % of a mix of $TiO_2$, $CaCO_3$, silica and erucamide, and B with $B^{iv}$ which is PVDC (VOC-VC) comprising 4 wt. % of epoxidised soybean oil, 1 wt. % of hydrotalcite, and 0.3 wt. % of a UV absorber. The thickness of the two combined PVDC layers is 20 μm, that of each of the two outer layers 30 μm, and the thickness of the overall 10-layer film 130 μm.

The OTR of the above structure at 0% and 100% R.H. is 13 and 14 cm$^3$/m$^2$.atm.day respectively.

MVTR of the above film at 38° C. and 98% R.H. was 4.7 g/m$^2$.

EXAMPLE 15

By following essentially the same procedure of the foregoing Example but varying the thickness of the outer layers from 30 μm to 25 μm, and that of the inner layers C to 5 μm each, a 10-layer 100 μm-thick film is obtained, with a layer ratio of 5/1/2/1/1/1/1/2/1/5.

EXAMPLE 16

By following essentially the same procedure of Example 14 but replacing A" with A as in Example 1, a high barrier 10-layer film, 130 μ-thick, is obtained with the following structure A/C/B$^{iv}$C/C/C/C/B$^{iv}$/C/A.

EXAMPLE 17

The film of Example 14 (160 mm width) was used on a Thimmonier VFFS machine for the manufacture of 250 cc pouches filled with a softener. Both the longitudinal seal (a lap seal about 8 mm wide) and the transverse seals were made by an RF sealer operating at 27.12 MHz. The line was running at about 45 pouches per minute. The seal resistance of the thus obtained pouches was evaluated by placing the pouch between two parallel horizontal stainless steel plates and increasing the pressure applied to the upper one until the pouch breaks. Said test was carried out on the pouches 2 hours after their manufacture and the pouches showed to withstand the applied pressure up to 250 kg. The same test, repeated after storage of the pouches for 3 months at room temperature, shows no statistically significant difference thus confirming that, unlike with PVC, with the structures according to the present Invention there is no deterioration of the mechanical properties of the packaging material with time. The appearance of the pouches after 3 month storage is almost identical to that of the original pouches.

PVC pillow pouches are actually employed for the packaging of flowable, generally liquid or pasty, non food products, such as products for personal hygiene such as soaps, shampoos, creams, lotions, etc. and household products such as detergents, chemical solutions, etc. The use of PVC in the manufacture of pillow pouches for food products, because of the migration of plasticizers into the product, would in fact be unacceptable. On the contrary with the films described in the present application, It Is possible to broaden up the range of products that can be packaged by including also food products, such as cold or warm sauces, creams, soups, and the like products. High and medium gas- and odour barrier properties could be achieved by modifying the PVDC layer(s).

What is claimed is:

1. A thermoplastic multi-layer film with an even number of layers comprising:

a) first and second outermost layers A each comprising ethylene-vinyl acetate copolymer having between 14 and 22 wt. % vinyl acetate;

b) first and second inner layers B each comprising vinylidene chloride copolymer; and c) first and second contiguous layers C separating first and second inner layers B from each other, each layer C comprising ethylene-vinyl acetate copolymer.

2. The thermoplastic film of claim 1 which is between 50 and 250 μm thick.

3. The thermoplastic film of claim 1 comprising first and second outer layers A each comprising ethylene-vinyl acetate copolymer having between 16 and 22 wt. % vinyl acetate, first and second inner layers B each comprising vinylidene chloride copolymer; and first and second contiguous layers C separating first and second inner layers B from each other, each layer C comprising ethylene-vinyl acetate copolymer having between 16 and 32 wt. % vinyl acetate.

4. The thermoplastic film of claim 3 wherein the first and second inner layers B are separated from each other by at least two contiguous layers C comprising ethylene-vinyl acetate copolymer containing from 22 to 28 wt. % vinyl acetate.

5. The film of claim 1 wherein the film has the layer sequence A/B/C/C/B/A.

6. The film of claim 1 wherein the thermoplastic multi-layer film is between 70 and 200 μm thick.

7. The film of claim 1 wherein the thermoplastic multi-layer film is between 75 and 150 μm thick.

* * * * *